United States Patent [19]

Bernus et al.

[11] Patent Number: 5,550,413

[45] Date of Patent: Aug. 27, 1996

[54] ELONGATE TORQUE MOTOR AND ANGULAR DISPLACEMENT CONTROL DEVICE INCORPORATING IT

[75] Inventors: Christophe Bernus, Paris; Patrice Jamain, Maule; Jean-Pierre Roland, Vienne en Arthie, all of France

[73] Assignee: Aerospatiale Societe Nationale Industrielle, France

[21] Appl. No.: 244,233

[22] PCT Filed: Sep. 22, 1993

[86] PCT No.: PCT/FR93/00922

§ 371 Date: May 19, 1994

§ 102(e) Date: May 19, 1994

[87] PCT Pub. No.: WO94/07299

PCT Pub. Date: Mar. 31, 1994

[30] Foreign Application Priority Data

Sep. 22, 1992 [FR] France ................... 92 11262

[51] Int. Cl.⁶ .................. H02K 26/00; H02K 7/09
[52] U.S. Cl. .................. 310/36; 310/114; 310/90.5
[58] Field of Search .................. 310/36, 38, 112, 310/114, 90.5

[56] References Cited

U.S. PATENT DOCUMENTS

| 4,607,180 | 8/1986 | Stoody | 310/80 |
|---|---|---|---|
| 4,831,296 | 5/1989 | Nagaba | 310/86 |
| 5,124,606 | 6/1992 | Eisenbeis | 310/114 |
| 5,319,274 | 6/1994 | New | 310/90.5 |

FOREIGN PATENT DOCUMENTS

| 2249474 | 9/1971 | France . |
| 2272515 | 7/1974 | France . |
| 2952786 | 9/1981 | Germany . |

*Primary Examiner*—Steven L. Stephan
*Assistant Examiner*—Judson H. Jones
*Attorney, Agent, or Firm*—Remy J. VanOphem; John VanOphem; Thomas A. Meehan

[57] ABSTRACT

A torque embodying an armature placed radially between a central bar and an external ferromagnetic tubular portion. The central bar is composed of two portions of the same cylinder diametrically opposite each other and having substantially equal angular amplitudes below 180° and separated by generally parallel longitudinal flats. A radial permanent bar magnet is incorporated in the central bar between the cylinder portions. The armature has a winding formed from longitudinal strands connected by transverse strands and arranged into bundles within which all currents flow in the same direction at all times.

29 Claims, 6 Drawing Sheets

ELONGATE TORQUE MOTOR AND ANGULAR DISPLACEMENT CONTROL DEVICE INCORPORATING IT

BACKGROUND OF THE INVENTION

The invention concerns a brushless torque motor with an angular displacement less than 180° and an application of this motor to controlling the angular displacement of a shaft, for example a shaft carrying a scanning mirror (or an antenna support, a filter, a lens, etc.), preferably but not exclusively in space applications.

Many kinds of torque motors are already known. The operation of these motors is based on producing a torque by causing an appropriate electric current to flow in wires, in practice portions of coils, disposed in a permanent magnetic field. However, known torque motors usually have a large overall dimension transversely or parallel to the rotation axis and a rotor (i.e., the rotating part of the motor) with a high inertia, especially if the latter carries the members generating the permanent magnetic field (in practice permanent magnets).

The term "armature" refers to the part of the motor carrying the wires carrying the current and the term "field assembly" refers to the complementary part of the motor carrying the members generating the permanent magnetic field.

SUMMARY OF THE INVENTION

An object of the invention is to provide a brushless torque motor combining low rotational inertia, compact overall dimensions (especially in the radial direction), a high angular displacement (although below 180°), a constant torque (with no ripple) over virtually all of the angular displacement (for a given current), great precision and freedom from divergent magnetic force (facilitating a combination with mounting of the rotor in bearings) and which is easy and simple to manufacture (leading to low unit cost and high reliability).

To this end the invention proposes a torque motor including a field assembly coupled to a shaft rotating within a given angular displacement about a given axis relative to a stator part including an armature.

In accordance with the invention, the field assembly includes an elongate central bar along the axis and a ferromagnetic tubular portion extending circumferentially all around the central bar at a predetermined distance therefrom. The central bar includes two portions of the same cylinder diametrally opposed and coaxial with the given axis, subtending substantially equal angles less than 180°, and separated by two globally parallel longitudinal flats, and a permanently magnetized central bar disposed along the given axis with its magnetization direction substantially parallel to the flats.

The armature is a tubular member disposed radially between the central bar and the ferromagnetic tubular portion and includes at least one coil having an input and an output and including separate parallel longitudinal strands connected by strands disposed transversally to the given axis. The longitudinal strands are divided into two diametrally opposed groups, all the strands of a group carrying current in the same direction when current is applied between the input and the output of the coil. Each group faces a respective cylinder portion, and the given angular displacement is less than the difference between the angle subtended by the cylinder portions and the groups.

According to preferred features of the invention, some of which may be combinable with others:

The permanently magnetized central bar extends from one flat to the other.

The central bar extends axially over a distance less than the length of the longitudinal strands and the transverse strands are axially offset to either side of the central bar.

The flats are plane and parallel.

The angle subtended by each cylinder portion is between 90° and 170°.

The angle subtended by each group is less than 30°.

The angle subtended by each cylinder portion is approximately 150°, the angle subtended by each group is approximately 30° and the amplitude of angular displacement is approximately 120°.

The tubular armature is in the form of a plurality of coils in series formed of radially stacked layers electrically insulated from each other. The input of each coil is connected to the output of the preceding coil, and the groups of coils, the longitudinal strands of which carry currents in the same axial direction at any time, are stacked radially.

The tubular armature is formed of two to ten layers of coils formed by printed circuit tracks.

Another object of the invention is to provide a device for controlling the angular displacement of a rotary body, for example, a scanning mirror, possibly on board an observation satellite, embodying a friction-free torque motor having the above properties and a low level of vibration in service and which is precise, stable and reliable and advantageously enables a small degree of tilting of the rotation axis (typically by an amount in the order of one milliradian), possibly in a space environment.

To this end the invention proposes a device for controlling angular displacement of a mobile assembly including a stator, a shaft coupled to the mobile assembly and extending along a given axis and including a motor of the aforementioned type, the shaft being mounted in at least one magnetic bearing.

According to other preferred features of the invention, some of which may be combinable with others:

The groups of the tubular armature are formed of adjoining conductive wires distributed within the thickness of the armature.

Each magnetic bearing has two transverse control axes.

Each magnetic bearing includes a ferromagnetic pole ring carried by the shaft and, around this ring, carried by the stator, a permanently axially magnetized ring, two pairs of axial cores carrying coils and two pole plates around the permanently magnetized ring and the pairs of cores.

There are two magnetic bearings each having two transverse control axes.

The ferromagnetic tubular portion of the motor includes two ferromagnetic pole rings which are part of two magnetic bearings.

The angular displacement control device includes a tilt control device including at least one of the pairs of coils of one of the bearings and a control unit adapted to vary the set point for the position of the shaft transversely to the rotation axis for at least this pair of coils.

The angular displacement control device includes a locking device adapted to hold the shaft radially in a given configuration.

The angular displacement control device includes two magnetic bearings and the locking device is disposed axially between the two magnetic bearings.

The locking device includes a plurality of clamps provided with clamp shoes articulated to a stator part around axial pins disposed at a distance from the axis and movable by a maneuvering member between an unlocked configuration in which the shoes are at a maximal distance from the axis and a locked configuration in which the shoes are at a minimal distance from the axis adapted to induce radial clamping of the shaft.

The clamping shoes are radially facing the ferromagnetic tubular portion of the motor.

The shaft includes axial abutments adapted to face the clamping shoes axially in the locked configuration whereby the shaft is held axially in the locked configuration.

The maneuvering member is an annular ring concentric with the axis and having a given angular displacement. The maneuvering member includes as many axial pins as there are clamps, each clamp including a circumferential slot through which one of the pins passes. The radially inner and outer edges of the slot form ramps for the pins, and the slot has a first circumferential end at a minimal distance from the rotation axis and a second circumferential end at a maximal distance from the rotation axis. When the pins on the ring are at the first circumferential ends of the slots, the clamps are in their unlocked configuration and when the pins on the ring are at the second circumferential ends of the slots, the clamps are in their locked configuration.

The pins are each provided with bearings adapted to roll on the radially external or internal edges of the circumferential slots.

Angular displacement of the ring is controlled by a second motor including an armature fastened to the ring and a field assembly coupled to the stator part of the angular displacement control device. The armature has globally the shape of a flat disk and the field assembly is formed by at least one pair of circumferentially separated magnetic armatures capping without contacting the radially external periphery of the disk over separate angular sectors, each having two flanges forming axial projections facing each other through the disk. At least one permanently magnetized ring portion coplanar with the axis is formed in each armature to generate a magnetic flux closing axially between the flanges through the armature. The armature includes at least one plane coil with an input and an output formed of circular arc strands concentric with the axis and radial strands connecting the circular arc strands to form at least one set of banana-shaped turns nested in each other but connected in series. The radial strands of each coil are grouped into at least one pair of groups formed of adjacent but separate strands so that, when a current is applied between the input and the output of the coil, all of the radial strands of the same group carry currents in the same radial direction. Each group of strands is disposed axially between the flanges of a respective armature, the axial direction of the flux through the armature between the flanges of each armature being chosen such that, when a current is applied between the input and the output of the coil, interaction between the currents flowing in the strands of the groups and the axial magnetic fluxes generates torques on the armature in the same direction, the amplitude of the angular displacement being defined by the difference between the angles subtended by the pairs of flanges and by the groups of radial strands.

The clamping shoes are urged radially towards the axis by spring members operating on the ring.

The maneuvering ring is joined to a stator portion by a plurality of globally radial elastic members operating in compression and mobile in a plane transverse to the axis to either side of an unstable configuration in which they are radially oriented between two stable extreme configurations for which the clamps are respectively in their locked and unlocked configurations.

By virtue of one aspect of the invention that is novel in itself, the radial air gaps of the magnetic bearing in which the shaft is mounted are exploited to enable tilting of the shaft which is minimal but in practice sufficient, for example, to compensate the advance in its orbit of a satellite carrying an angular displacement control device supporting a scanning mirror with its axis parallel to the orbit. Such tilting is advantageously commanded by modification of the set point for the position of the shaft in its magnetic bearing(s). To this end, the bearing is advantageously chosen to have at least one active radial axis (transverse to the tilt axis) or opposite direction axial actions applied at diametrally opposed areas of the rotor part of the bearing.

Objects, features and advantages of the invention emerge from the following description given by way of nonlimiting example with reference to the appended drawings.

DETAILED DESCRIPTION OF THE PREFERRED EMBODIMENT

Figure 1:
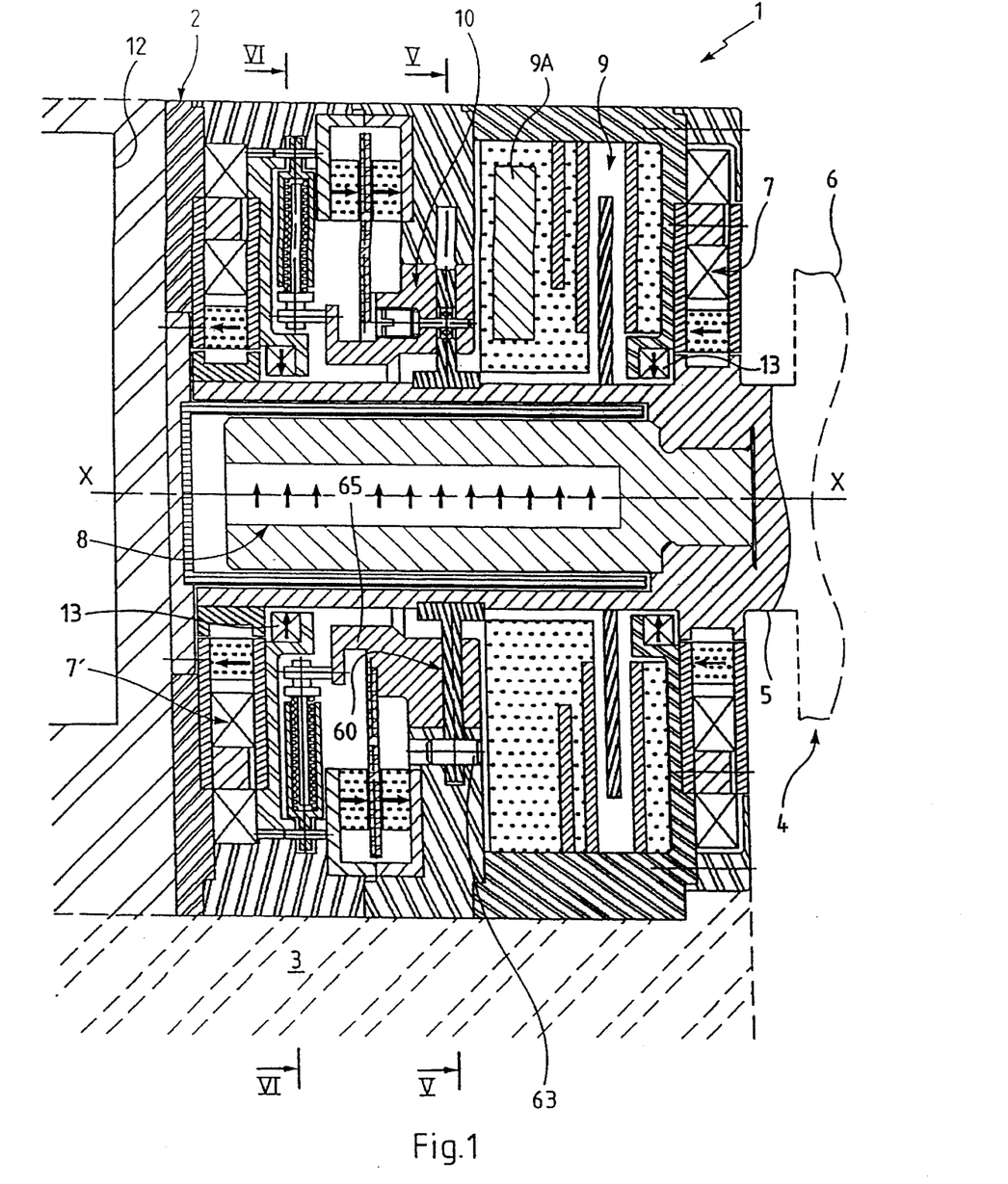
FIG. 1 is a diagrammatic axial section of an angular displacement control device.

FIG. 1 shows an angular displacement control device 1 including a stator part 2 intended to be fixed to a support 3, for example a satellite in terrestrial orbit, and a rotor part 4 rotatable relative to the stator part 2 about an axis X—X, for example an axis parallel to the aforementioned orbit, including a shaft 5 and a payload 6 such as a scanning mirror.

The device 1 essentially embodies bearings 7 and 7', a motor 8, an optional angular resolver 9, a locking device 10 (advantageously disposed axially between the bearings, which improves the retention of the shaft), a tilt control device and an electronic unit 12 controlling the operation of the various components of the device 1. Radial position sensors 13 are provided for the bearings 7 and 7'.

The bearings 7 and 7' are active magnetic bearings which eliminate all friction and all the drawbacks usually associated with friction such as vibration, hysteresis phenomenon on reversing the direction of motion, etc., which would be prejudicial to good angular accuracy. In this example they are identical.

By virtue of an aspect of the invention that is novel in itself, the tilt control device exploits the existing axial or radial angular displacement between the rotor and the stator of a magnetic bearing to obtain tilting either by radial displacement of the rotor part of the bearing or by axial action in opposite directions at two diametrally opposed areas of the rotor part.

The motor 8 has a limited angular displacement which in this example can approach (but not reach) a value of 180°; it is very elongate in the axial direction, so that its overall radial dimension is much smaller than prior art motors; this is combined with very low rotational inertia about the X—X axis.

The angular resolver 9 senses the angular position of the rotor part 4 relative to the stator part and is of any appropriate known type, for example the magnetic or optical type.

The locking device 10 is novel in itself in that it is a reversible mechanical system of the self-centering clamp type, avoiding the drawbacks of pyrotechnic solutions (including pollution, on-off action, insufficient control of manufacturing reproducibility, insufficient safety in the presence of human operatives) and enables complete ground tests with a plurality of locking and unlocking cycles.

The various stages mentioned above are described in more detail below.

Various numerical values are given, in relation to the example under consideration here, corresponding to the following specifications for a satellite optical scanning system:

| | |
|---|---|
| aiming accuracy: | $0.25 * 10^{-3}$ mech rad |
| stability over 150 ms: | $0.085 * 10^{-3}$ mech rad |
| maximum angular displacement: | 113.925° |
| reaction disturbing torque: | $6 * 10^{-2}$ N.m |
| transition time between two aiming positions offset by 1.65° mechanical: | 66 ms |
| mechanical mass: | <4 kg |
| tilt amplitude: | $1.38 * 10^{-3}$ rad |
| supply voltage: | 22–37 V |
| service life: | 4 years (storage) + 5 years (service) |

Figure 2:
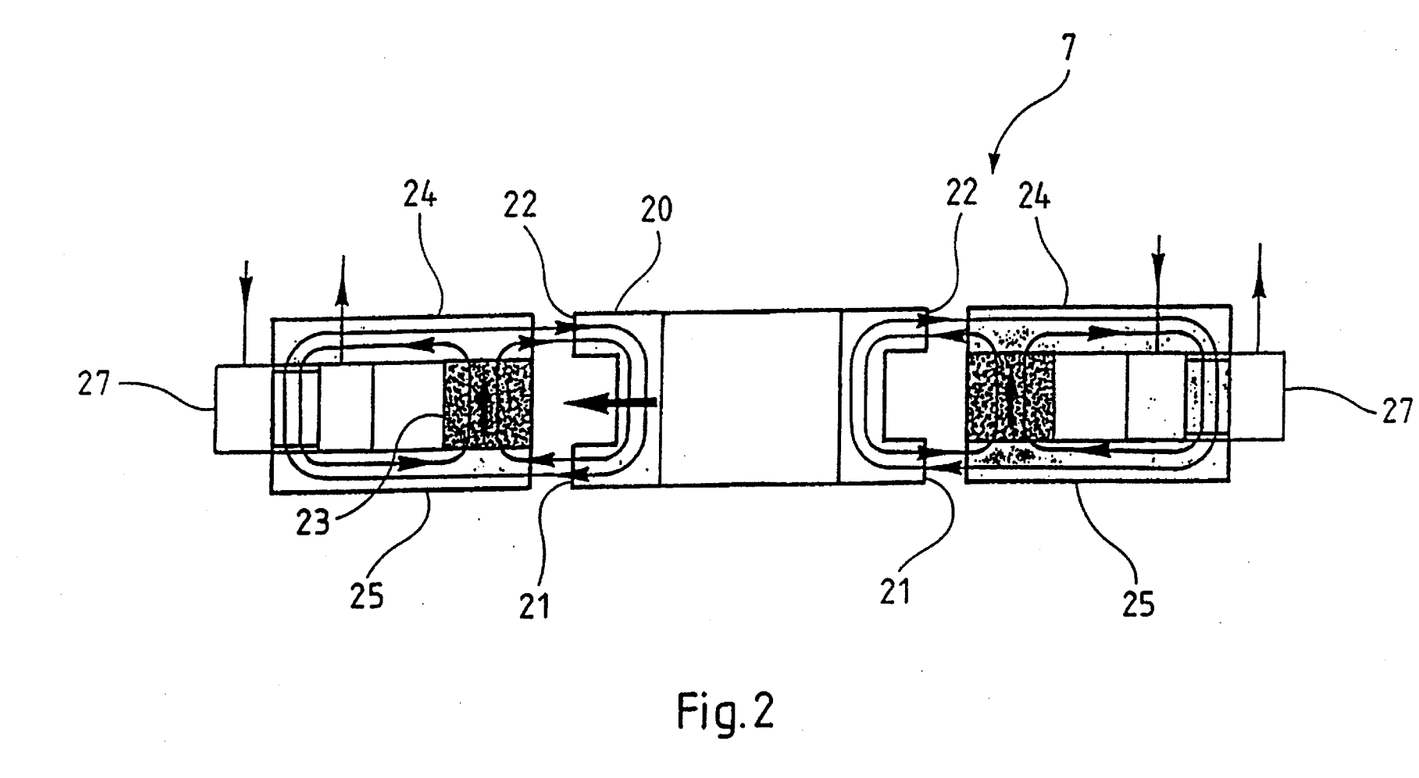
FIG. 2 is an axial section of the magnetic bearing from FIG. 1.

FIG. 2 shows the structure and operation of the magnetic bearing 7 or 7'.

The magnetic bearing 7 (or 7') is of a conventional type known from French Patent 87-03489 or U.S. Pat. No. 4,918,345 (Vaillant De Guelis et al).

The bearing 7 in this example is of the type with two transverse control axes (the expression "active radial control and passive axial control" is sometimes used to describe this type of bearing). This solution is beneficial for reasons including the compact overall size in the axial direction.

If this constraint does not apply, a bearing with passive radial control and active axial control may be preferable, having advantages of simplicity from the electronics point of view.

A magnetic suspension system can never be completely passive since it can be shown that there is always at least one degree of freedom in which the suspended part (the rotor) is in a state of unstable equilibrium (i.e. the suspension has a negative stiffness for this degree of freedom), requiring the use for this degree of freedom of an active loop with coil type actuators.

As is made clear below, the fact that the bearing 7 or 7' has active radial control has the advantage that by modifying the control set points it is possible to control the tilting of the X—X axis of the shaft.

Referring to FIG. 2, the bearing includes on the rotor part side a simple ferromagnetic pole ring 20 having annular flanges 21 and 22 and on the stator side a ring 23 of axially magnetized permanent magnets sandwiched in the axial direction between two flat annular pole pieces 24 and 25 defining air gaps with the flanges 21 and 22 and also surrounding two pairs (of which only one can be seen) of diametrally opposed axial cores 26 offset 90° and carrying coils 27. Radial slots (which cannot be seen) are advantageously provided in the pole pieces alternating circumferentially with the core/coil combinations to prevent (in the conventional way) magnetic leakage from one coil to the other. Two diametrally opposed coils are associated with each radial control axis (of which there are two in this example). They are electrically connected together to form a circuit independent of that for the other axis.

In this type of bearing the rotor is returned by passive means if it is displaced axially or if it tilts about an axis perpendicular to the X—X axis.

The flux from the coils and the magnets intermingle. The permanent magnets of the ring 20 produce a static main flux and the coils, when energized by a current in a given direction, generate an additional flux which modulates the permanent or static flux in the air gaps and therefore increases on one side of the ring (the left-hand side in FIG. 2) and reduces on the other side of the ring (the right-hand side in FIG. 2) the radial force applied to the suspended part so as to apply to the latter a radial force whose direction and amplitude tend to return the suspended part to its equilibrium position. It is sufficient to reverse the current in the coils to generate a force in the opposite direction. The coils associated with the same axis are naturally mounted and energized so that they always apply forces in the same direction. An advantage of this arrangement is that it produces a quasilinear force/current characteristic. This enables the use of simple linear amplifiers in the electronic unit.

The bearing has a very low rotational inertia since most of the component parts of the bearings are carried by their respective stator part.

In addition to the absence of friction (increasing the service life) and of "friction noise" (improving angular accuracy), permanent magnet bearings have the following advantages: very compact overall size; virtually null continuous consumption in the absence of vibrational disturbance; and radial, axial and tilt stiffnesses more than sufficient for the intended application.

One example of the dimensions of the bearing 7 (or 7') is as follows:

| | |
|---|---|
| mean diameter of bearing rotor: | 47 mm |
| air gaps: | 0.60 mm |
| rotation inertia of both rotors: | $7.1 * 10^{-6}$ kg.m² |
| mass of magnets: | 70 g |
| stiffness (per bearing): | |
| axial: | 20 N/mm |
| radial: | 100 N/mm |
| abutment radial clearance (at radius): actuator: | 0.20 mm |

-continued

| | |
|---|---|
| number of turns: | 170 |
| wire diameter: | 0.6 mm |
| lift current under 1 g for 0.2 mm of initial offset (worst case, ground tests): | 2 A |
| minimum lift voltage: | 5 V |

Note that during ground tests, if the assembly is disposed with the axis vertical the radial control loop does not require more electrical power than in flight. The weight of the suspended assembly does not affect the radial position of the rotor. The lift voltage and current indicated above are rated to enable the bearing to operate on the ground regardless of its position; however, only the vertical position with the weight compensated by an axial device (counterweight and pulley) is representative of operation in zero gravity.

As an alternative (not shown), the magnetic bearings can be of the type described in U.S. Pat. No. 4,470,644 (Weisser) including a ring of magnets fastened to the rotor.

Control is based on information supplied by the radial position sensors 13 of the rotor (two sensors per control axis). The magnetic bearings 7 and 7' can use speed sensors or displacement sensors and it will be apparent to one skilled in the art to adapt the electronic unit accordingly.

Figure 10:
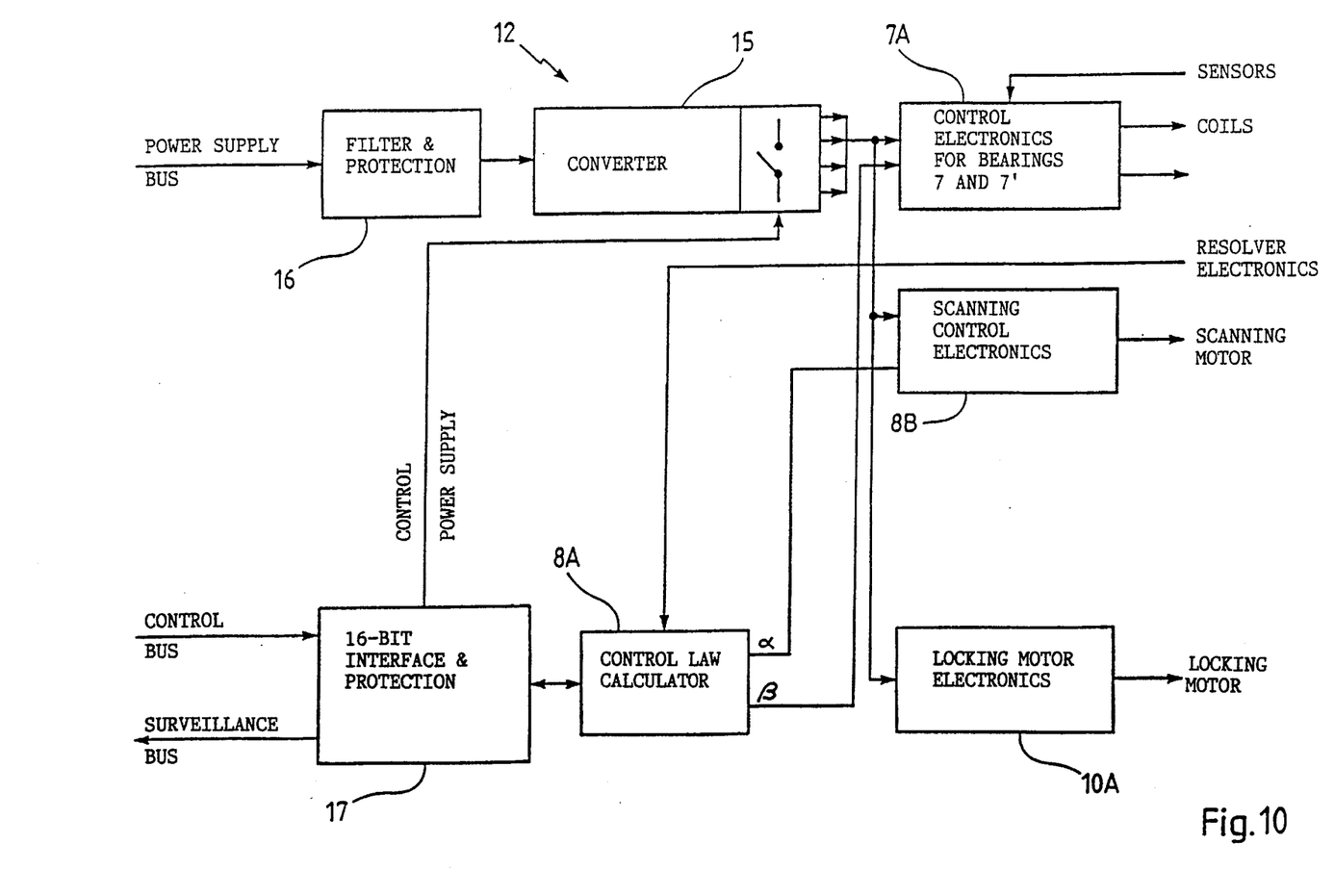
FIG. 10 is a block diagram of the control electronics of the device from FIG. 1.

The magnetic levitation stability of the rotor is assured by two identical control systems each respective to one axis, shown conjointly under reference 7A in FIG. 10. Each system has three functions:

an input signal processing stage;

a correction stage; and an amplification stage.

The only functions of the position sensors that are shared are generation of the 50 kHz carrier frequency.

The electronics receives as input a signal imaging the position of the rotor; this is processed by a corrector providing the transfer function required for stable control. A power amplifier provides the interface to the bearing.

Radial lifting of the rotor from an abutment position is effected automatically without requiring any additional function. The rotor can lift from the abutment position only when the control voltage is present.

Figure 3:
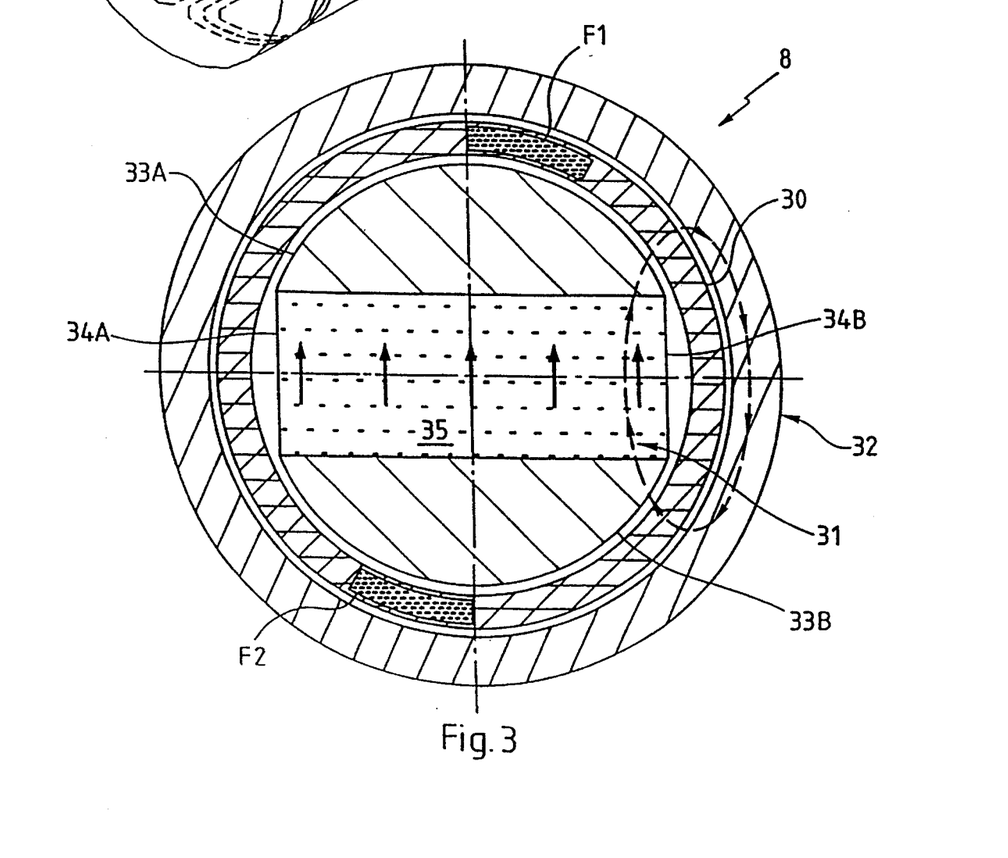
FIG. 3 is a transverse section of the motor from FIG. 1.
Figure 4:
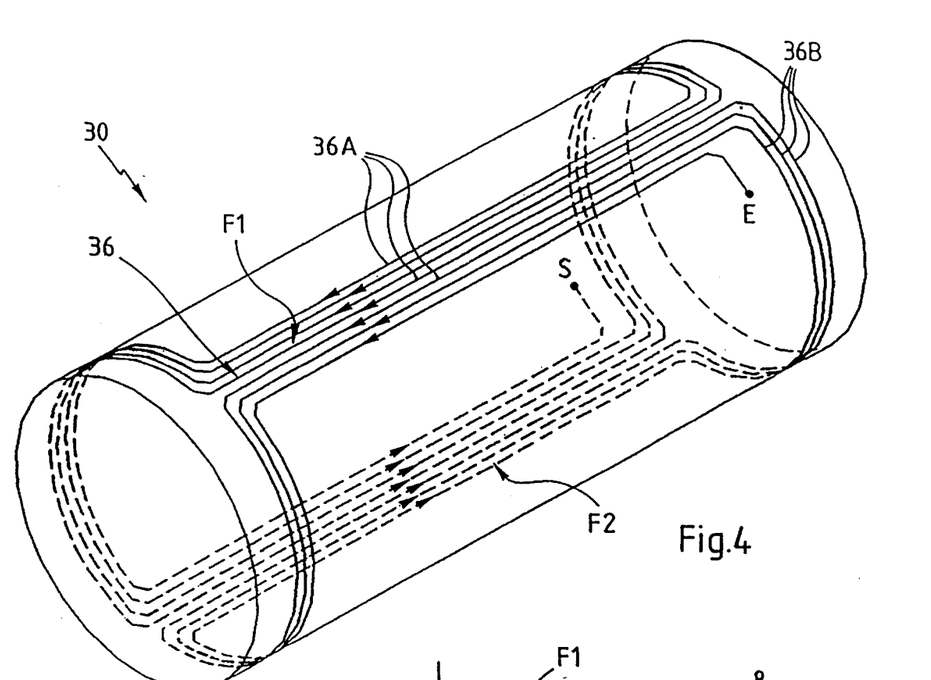
FIG. 4 is a perspective view of the stator part (in this example the armature) of the motor.

Referring to FIGS. 3 and 4, the motor 8 controlling angular displacement of the rotor part 4 is a torque motor with its angular displacement limited to approximately 120°. It is located entirely within the overall radial dimension of the shaft 5.

To be more precise, the torque motor 8 includes, on the stator side, a tubular armature 30 and, on the rotor side, a field assembly in the form of a central bar 31 extending axially inside the tubular armature and a ferromagnetic tubular portion 32 extending all around the tubular armature 30.

FIG. 1 shows that the ferromagnetic flanges of the magnetic bearings 7 and 7' are also on the ferromagnetic tubular portion 32.

An annular air gap whose radial dimension is normally constant exists between the tubular armature 30 and the tubular rotor portion 32; the external surface of the armature and the internal surface of the tubular portion are cylindrical. However, the external surface of the central bar 31 is in the form of two portions 33A and 33B of a common cylinder subtending substantially equal angles less than 180° (for example 150°); they are diametrally opposed and separated by two longitudinal flats 34A and 34B (which are plane and parallel in this example) so that the two cylindrical portions 33A and 33B define with the armature two air gaps whose radial dimension is very much less than the average radial distance between the flats and the field assembly. As an alternative (not shown) the flats are convex or preferably concave.

A permanent bar magnet 35 is disposed in the central bar 31 with its direction of magnetization transverse to the axis and parallel to the flats so as to generate a magnetic flux from one cylindrical portion to the other. This flux leaves one cylindrical portion and travels radially through the armature as far as the tubular ferromagnetic portion in which it flows circumferentially until it re-enters the central bar via the other cylindrical portion. One flux line is shown by way of example.

The permanent bar magnet advantageously extends the full width of the central bar between the flats so that the central bar forms a bar magnet separating two pole pieces.

As shown in FIG. 4, the armature includes at least one coil 36.

Each coil 36 includes separate parallel longitudinal strands 36A (the distance between these is exaggerated in FIG. 4 for reasons of clarity), connected by strands 36B disposed transversely to the axis, in this example in circular arcs so that the strands are all in series between an input terminal E and an output terminal S. The longitudinal strands are divided into two diametrally opposed groups F1 and F2 which subtend angles less than those of the cylindrical portions of the central bar, for example an angle in the order of 20° in this example. All the strands of the same group carry current in the same direction if current is applied between terminals E and S.

The groups are disposed on the armature so that they face the cylindrical portions of the central bar. Accordingly, as soon as current is applied in one direction or the other between the terminals E and S, the interaction of this current flowing in the longitudinal strands with the magnetic flux flowing through the armature generates a torque on the bar. The maximum angular displacement of the field assembly is therefore substantially equal to the difference between the angle subtended by the groups of the armature and the angles subtended by the cylindrical portions of the central bar.

The currents flowing in the transverse strands do not generate any torque, of course.

These transverse strands are preferably offset axially from the central bar permanent magnet. In other words, the central bar is advantageously shorter than the longitudinal strands (to prevent the occurrence of coaxial forces).

Although permanently magnetized materials usually have a high density, in the invention this has little impact on the rotational inertia of the mobile assembly given that the bar magnet is on the rotation axis.

The coil 36 can be made by depositing tracks using printed circuit technology, in which case the armature can include a plurality of coils 36 formed by radially stacked printed circuit layers electrically insulated from each other, the input of each coil being connected to the output of the preceding coil so that all the coils are in series. The like groups of the various coils are stacked radially so that the torques generated by adjoining groups add rather than subtract.

However, referring to FIG. 3, the coils can be formed of wires such that the strands of the groups are conductive wires distributed over the thickness of the tubular armature.

The configuration of the motor 8 can therefore produce high torques with armatures having a low rotational inertia;

it has the further advantage of generating a constant torque (without ripple) for a given current over all of its angular displacement, i.e. approximately 130° in this example, which could not be reliably achieved using a synchronous motor or a commutator motor with several pairs of poles. Another fundamental advantage of the motor 8 is the absence of divergent magnetic force (negative stiffness), enabling it to be used in conjunction with a magnetic bearing without further stability problems.

The main specifications of the motor are typically:

| | |
|---|---|
| mean diameter of stator coil (armature): | 28.5 mm |
| stator tube thickness: | 2.2 mm |
| field in air gap: | 0.3 T |
| coil resistance: | 2.3 ohms |
| rotor inertia (magnet + center tube): | $6.46 * 10^{-6}$ kg.m$^2$ |
| maximum torque: | $6 * 10^{-2}$ N.m |
| current at maximum torque: | 2 A |
| power dissipated at Imax: | 9 W |

Two (known) angular position sensing technologies can achieve the required angular precision:

Optical resolver 9 (as used in this example) embodying an engraved glass disk and several emitter (optical diode) and receiver (not shown) pairs offset by a quarter of the engraving pitch to indicate the direction of rotation and improve the accuracy of the resolver. A possible drawback of this type of resolver is the very small clearance required between the disk and the emitter/receiver pairs (a few tens of microns). On the other hand, the electronics (9A in FIG. 1) is relatively simple. This type of decoder is a relative device (increment-decrement) and requires a marker for the zero position.

Variable reluctance magnetic resolver (not shown) embodying a rotating part joined to the shaft and advantageously in the form of two toothed rings offset axially and radially (by half the angular offset between the teeth of the rings—there are 32 teeth, for example, so that the radial offset is 5.625°—to indicate the direction of rotation) and a fixed part also embodying two toothed rings but with the teeth surrounded by coils. A sinusoidal AC voltage is fed into the coils of each ring of the fixed part (all the coils are in series) and the output current retraces the reluctance of the magnetic circuit thus formed: low reluctance for the facing teeth and high reluctance when the teeth in one ring are aligned with the gaps in the other ring. The shape of the teeth is adapted to produce a sinusoidal output signal for one pole pitch: appropriate processing electronics (synchrodigital resolver) then provides an accurate indication of the angular position over one pole pitch. This resolver is therefore a hybrid device: absolute for each pole pitch, but relative (incremental) from one pole pitch to another. With 32 teeth on each ring and the synchrodigital resolver the required accuracy is achieved. The advantage of this principle is the possibility of using relatively wide air gaps (0.25 mm–0.3 mm) compatible with the flexibility of the magnetic bearing.

The mirror 6 is positioned at the required set point value by a control unit 8A (FIG. 10) receiving as input the information from the angular resolver and the scanning set point. Its output is a control signal output.

The scanning motor is controlled (unit 8B in FIG. 12) by a current amplifier whose linearity and crossover distortion are compatible with the required performance. The amplifier receives as input the analog control unit a and outputs a current whose sign and amplitude are proportional to the torque required to control the scanning motor.

If possible, it is energized directly from the unregulated output voltage of a converter 15 connected to a power supply bus by a filter and protection device 16.

To control tilting of the shaft more coils can be provided around cores at least approximately axially facing a rotor part. These coils are on opposite axial sides of the rotor part, in diametrally opposed areas relative to the axis about which tilting is required. Tilting is then controlled by activating two such coils disposed on opposite sides of the rotor part and its axis, in order to attract the rotor in one axial direction in one area and in the opposite axial direction in a diametrally opposed area, which applies a transverse torque to the shaft. This exploits the fact that the magnetic bearing has a positive stiffness in tilting.

However, it is preferable to exploit the presence of two magnetic bearings to obtain tilting simply by displacing the set point position of at least one bearing or the set point positions of the shaft in opposite radial directions for the two bearings, which induces a torque.

For example, the bearings 7 and 7' are disposed so their transverse control axes are parallel and the coils of the bearings operating parallel to a common direction are energized. Tilting is in fact obtained if the set point for a single pair of coils in a single bearing is displaced.

This tilting is controlled by the control electronics 7A (FIG. 10) according to the tilt set point β.

FIGS. 5 through 9 show the locking device 10.

Figure 5:
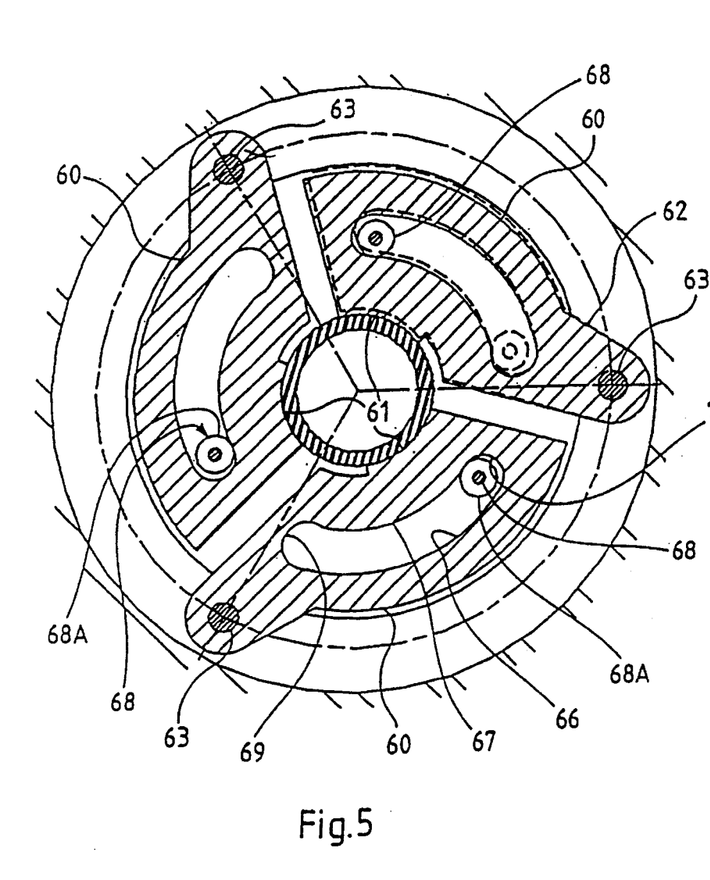
FIG. 5 is a partial transverse view of the locking device on the line V—V in FIG. 1.

The locking device 10 embodies three clamps 60 each having a clamp shoe 61 adapted, with the shoe 61 of the other clamps, to grip the shaft 5. As shown in FIG. 1, the shoes preferably enter a circumferential groove on the shaft whose flanks enable axial retention of the shaft in one direction at least (more generally, a few axial bearing surfaces for the edges of the shoes may suffice).

In areas 62 offset radially and circumferentially relative to the shoes 61, the clamps 60 are articulated to the stator part of the device as a whole by means of axial pins 63.

The clamps 60 are accommodated in a transverse slot in a ring 65 (see also FIG. 1) adapted to rotate about the X—X axis with limited angular displacement, for example, 60°.

Each clamp includes a slot 66 whose radially inner and outer edges 67 and 67', which are not concentric with the X—X axis, form ramps for an axial pin 68 fastened to the ring and passing through the slot. The pins 68 are preferably provided with bearings 68A to minimize friction on the ramps. Each slot 66 has a first circumferential end 69 near the articulation of the axial pin 63 where the edge 67 is at a minimal distance from the axis of its shoe 61 and a second circumferential end 70 far from the articulation of the axial pin 63 where the edge is at a maximal distance from the shoe axis.

The three axial pins 68 are positioned in the ring 65 through its slot so as to be simultaneously either at the first circumferential ends 69 (unlocked configuration) or at the second circumferential ends 70 (locked configuration).

Figure 6:
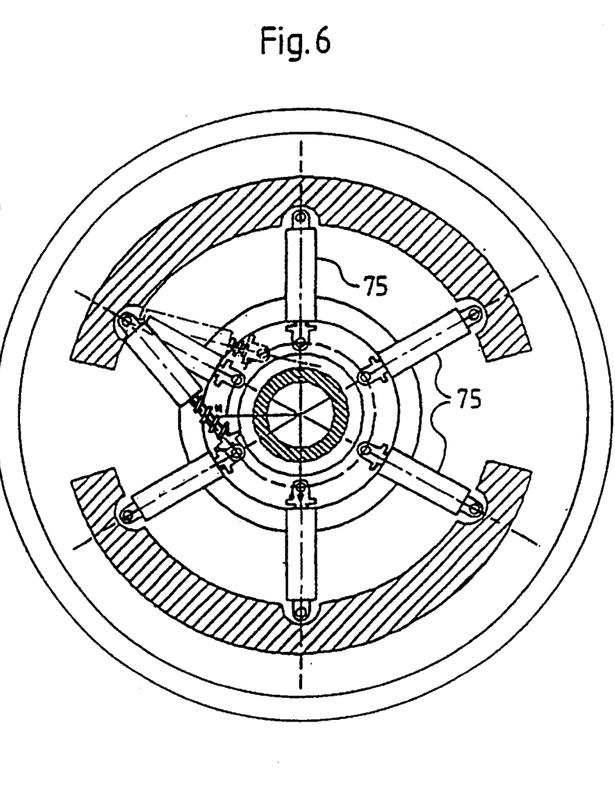
FIG. 6 is another partial view of the locking device on the line VI—VI in FIG. 1.

The ring 65 is rotationally spring-loaded towards one or other of the locked and unlocked configurations by a passive bistable system using elastic members 75 (based on springs—see below). This guarantees that the unlocked configuration is maintained and not only that the locked configuration is maintained but also application of force to the shaft by the shoes: in practice the slots 66 have dimensions such that the clamping shoes are applied to the shaft before the pins abut circumferentially against the second circumferential ends 70.

Figure 7:
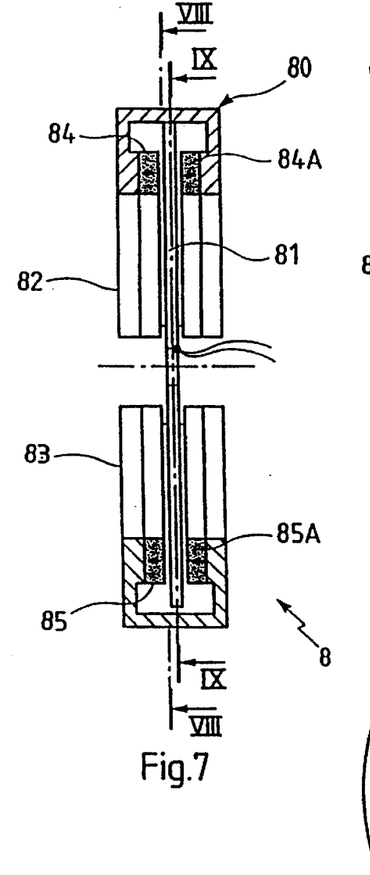
FIG. 7 is an enlarged view of the motor of the locking device, shown in isolation.
Figure 8:
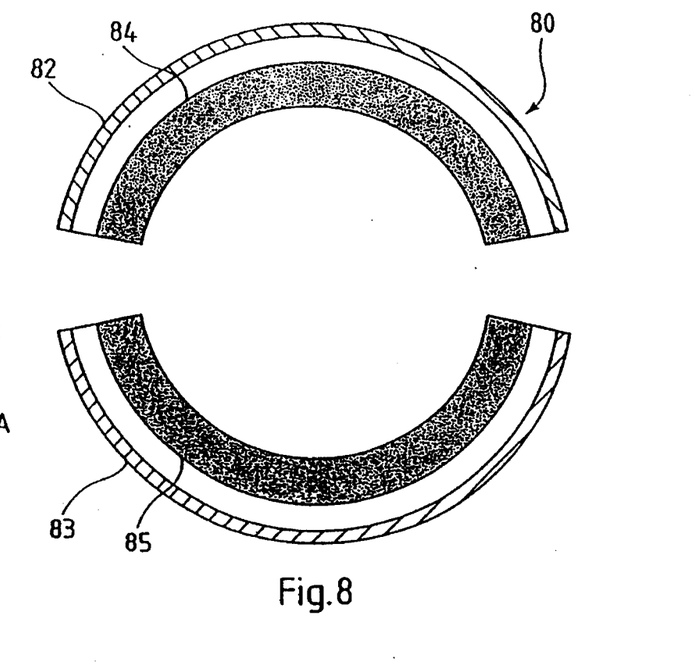
FIG. 8 is a section of the stator part of the motor from FIG. 7 on the line VIII—VIII in FIG. 7.
Figure 9:
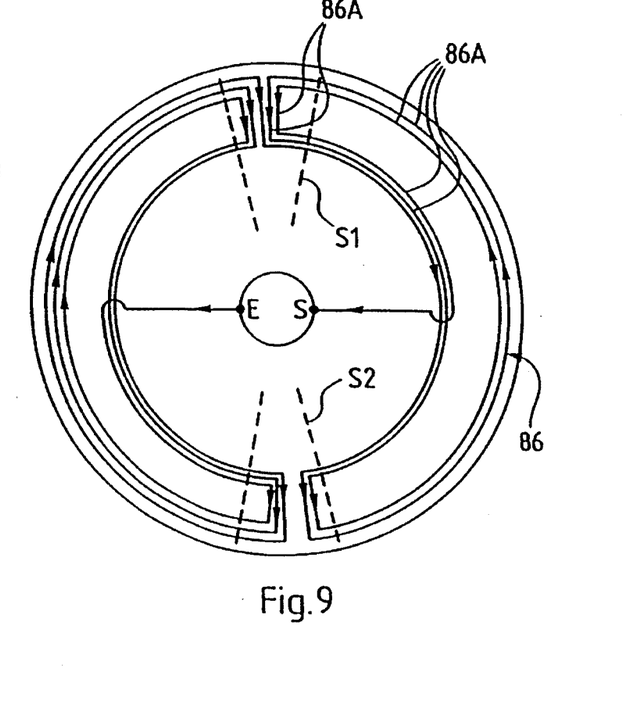
FIG. 9 is a transverse section of the mobile disk of the motor (in this example its armature) on the line IX—IX in FIG. 7.

The ring 65 is maneuvered between its two configurations against the previously mentioned passive bistable return means by a motor 71 which is advantageously of the type shown in FIGS. 7 to 9.

The motor 71 driving the ring 65 is a torque motor with its angular displacement limited to approximately 120°. It includes a stator part or field assembly 80 including a pair of poles and a rotor part or armature 81 embodying a disk carrying one or more flat coils, each preferably implemented in printed circuit technology.

To be more precise, and referring to FIGS. 4 and 5, the field assembly 80 includes a pair of separate magnetic armatures 82 and 83 capping but not contacting the periphery of the armature over angular sectors subtending an angle of less than 180° (for example 150°) and having axially projecting flanges facing each other axially through the armature and defining with the latter radial air gaps. Each armature carries at least one portion of a respective ring permanent magnet 84 or 85 generating a magnetic flux closed axially through the armature; these portions of ring permanent magnets 84 and 85 advantageously run along the air gaps on either side of the armature 81 and are therefore magnetized axially.

In the example under consideration here the respective magnetic fluxes of the two armatures pass through the armature in respective different directions and the ring portions 84 and 85 have opposite axial magnetization directions.

For proper control of the magnetic flux through the armature the latter is advantageously interposed axially between two ring permanent magnet portions 84 and 84A or 85 and 85A for each armature.

The coil(s) formed on the armature 81 are formed by circular arc strands 86A concentric with the axis X—X and connected by radial sections or strands 86B divided into two sectors or groups S1 and S2 which are diametrally opposed and subtend an angle of about 30°, for example. The circular arc strands 86A and the radial sections 86B are joined to form a coil 86 having an input terminal E and an output terminal S.

FIG. 6 shows a coil 86 of this kind and in this drawing, for reasons of clarity, the distance between the adjoining radial sections 86B or the adjoining arc strands 86A are exaggerated, which has reduced their number. Note that the circular arc strands subtend an angle of almost 180° and that the radial strands of each of the two sectors S1 and S2 carry current in the same direction when current is applied between the terminals E and S. The circular arc strands define with the radial sections "banana-shape" turns nested one within the other to form at least one set of turns, in this example two sets of turns disposed on opposite sides of a diameter joining the sectors S1 and S2. One radial section (in this example the median section of sector S1) joins the two sets of turns (which therefore constitutes two half-coils).

The directions in which the current flows in the sectors are chosen so that, when each sector is sandwiched (without contact, in order to provide the aforementioned axial air gaps) in a respective armature, the permanent magnetization fluxes of the two armatures which close through the sectors induce torques in the same direction on the armature.

The current in the circular arc strands does not induce any torque on the armature.

This principle can be generalized to motors with one phase and n pairs of poles, provided that the required angular displacement is less than 2π/n, in which case n pairs of diametrally opposed sectors are provided on the armature; there can be one or more coils per printed circuit layer, with banana-shape turns extending from a sector corresponding to one pair of poles to an adjacent sector extending to another pair of poles. As previously, the amplitude of the angular displacement is defined by the difference between the angle subtended by the armatures and by the sectors or the groups of radial strands.

The angle subtended by the armatures is the angle subtended by their flanges and it is only preferable for the back of the armatures to subtend the same angle as the flanges: as an alternative to this, the radial back could subtend a smaller angle.

The coil 86 can be formed by depositing tracks using printed circuit technology.

The armature can include a plurality of coils 86 formed as axially stacked printed circuit layers electrically insulated from each other, the input of each coil being connected to the output of the preceding coil so that the coils are in series, the sectors S1 and S2 of the various coils being stacked axially.

The motor is controlled by electronics 10A (FIG. 12).

The configuration of the motor 71 procures a small axial overall dimension and a high torque.

The ring 65 to which the armature of the motor 71 is fixed is preferably joined to the annular magnetic part (or any stator part) by a plurality of (for example 4 or 6) the generally radial elastic members 75 operating in compression. In this example they are articulated and mobile transversely to the axis between two extreme configurations in which the clamps are either in the locked or unlocked configuration; these elastic members have an intermediate configuration (of unstable equilibrium) in which they are radially oriented, with the result that the locking device is a passive bistable device. These spring members have a twofold function (see above) in that they generate the clamping force and provide this bistable positioning.

The spring members thus assure:

secure locking (no unlocking due to vibration);

secure unlocking; and a reversible locking/unlocking function.

This solution avoids the use of pyrotechnic release means and enables a plurality of locking and unlocking cycles of the complete system during ground tests so that the locking system itself can be tested. The system is therefore designed to be operated a plurality of times on the ground and once only in flight to effect the unlocking.

With regard to the power supply (see FIG. 12), the only power supply required is the primary voltage of the power supply bus. The power supply electronics (unit 16 already mentioned) has at its input the protection arrangements required to preserve the integrity of the power supply and the necessary filters.

Thereafter one or more converters 15 provide the voltages required by the electronics of the scanning system and galvanic isolation.

The system is interfaced to and protected from the onboard computer (and vice versa) by a unit 17 (FIG. 10) to which it is connected by a control bus and a surveillance bus.

A dynamic compensation system can be provided, if necessary, to eliminate or at least strongly reduce the reaction torque transmitted to the satellite. The theory of this system would be based on the rotation of an inertia wheel in the opposite direction to the mirror. Various solutions are feasible, but the only one which would seem reliable (although representing a penalty from the mass point of view) without degrading the angular accuracy of scanning is to install on the axis of the main system another magnetic bearing rotated by a motor identical to that of the scanning system and coupled to a flywheel. No mechanical linkage (gearing) links the main system to this new bearing-motor-flywheel system; both motors (scanning and dynamic compensation) are simply connected together (in series so as to obtain the same torque) in opposition: the scanning control system therefore activates at the same time the system carrying the mirror and the flywheel. The resulting torque transmitted to the satellite is therefore the difference between the torques of the two motors, i.e. the difference between the fields of the magnets of the stators of each of the two motors.

The foregoing description is obviously given by way of nonlimiting example and numerous variants can be put forward by one skilled in the art without departing from the scope of the invention. For example, the resolver can be dispensed with, for example if the rotor of the motor is spring-loaded towards a given neutral configuration relative to the stator.

We claim:

1. A torque motor comprising:

a stator member;

a shaft rotatable about an axis and having a limited angular displacement relative to said stator member;

a field assembly coupled to said shaft and comprising:
   an elongate central bar disposed along said axis, said elongate central bar including two diametrically opposed portions of a cylinder coaxial with said axis, each of said two diametrically opposed portions subtending substantially equal angles of less than about 180 degrees, said elongate central bar further including two parallel longitudinal flats separating said two diametrically opposed portions;
   a ferromagnetic tubular portion circumscribing said elongate central bar at a radial distance therefrom; and
   a permanently magnetized central bar disposed along said axis interposed said two diametrically opposed portions of said cylinder coaxial with said axis; said permanently magnetized central bar having a magnetization substantially parallel to said two parallel longitudinal flats; and an armature associated with said stator member, said armature comprising a tubular member disposed radially between said elongate central bar and said ferromagnetic tubular portion, said armature including at least one coil having an input and an output, said at least one coil having separate parallel longitudinal strands connected by transverse strands disposed transversely to said axis, said longitudinal strands being divided into two diametrically opposed groups, each strand of one of said diametrically opposed groups carrying current in a same direction when current is applied between said input and said output of said at least one coil, each of said diametrically opposed groups facing a respective one of said two diametrically opposed portions of a cylinder, said limited angular displacement of said shaft being less than a difference between a first angle subtended by one of said two diametrically opposed portions and a second angle subtended by one of said diametrically opposed groups.

2. A torque motor according to claim 1 wherein said permanently magnetized central bar extends from one of said two parallel longitudinal flats to the other of said two parallel longitudinal flats.

3. A torque motor according to claim 1 wherein said permanently magnetized central bar extends axially over a distance less than a length of said longitudinal strands, and said transverse strands are axially offset from ends of said permanently magnetized central bar.

4. A torque motor according to claim 1 wherein said two parallel longitudinal flats are plane and parallel.

5. A torque motor according to claim 1 wherein each of said two diametrically opposed portions subtends an angle between about 90° and about 170°.

6. A torque motor according to claim 1 wherein each of said diametrically opposed groups of said longitudinal strands subtends an angle of less than about 30°.

7. A torque motor according to claim 4 wherein each of said two diametrically opposed portions of a cylinder subtends an angle of approximately 150°, and wherein each of said two diametrically opposed groups of said longitudinal strands subtends an angle of approximately 30° and said limited angular displacement is approximately 120°.

8. A torque motor according to claim 1 wherein said at least one coil comprises a plurality of coils in series formed of radially stacked layers electrically insulated from each other, each of said plurality of coils having an input connected to an output of a preceding one of said plurality of coils, each of said two diametrically opposed groups of longitudinal strands being stacked radially.

9. A torque motor according to claim 8 wherein said tubular member further comprises two to ten layers of said plurality of coils formed by printed circuit tracks.

10. A torque motor according to claim 1 wherein said two diametrically opposed groups of longitudinal strands are formed of adjoining conductive wires distributed within a thickness of said tubular member.

11. A device for controlling angular displacement of a mobile assembly, said device comprising:

a stator member;

a shaft rotatable about an axis and having a limited angular displacement relative to said stator member;

a field assembly coupled to said shaft and comprising:
   an elongate central bar disposed along said axis, said elongate central bar including two diametrically opposed portions of a cylinder coaxial with said axis, each of said two diametrically opposed portions subtending substantially equal angles of less than about 180 degrees, said elongate central bar further including two parallel longitudinal flats separating said two diametrically opposed portions;
   a ferromagnetic tubular portion circumscribing said elongate central bar at a radial distance therefrom; and
   a permanently magnetized central bar disposed along said axis interposed said two diametrically opposed portions of said cylinder coaxial with said axis; said permanently magnetized central bar having a magnetization substantially parallel to said two parallel longitudinal flats;

an armature associated with said stator member, said armature comprising a tubular member disposed radially between said elongate central bar and said ferromagnetic tubular portion, said armature including at least one coil having an input and an output, said at least one coil having separate parallel longitudinal strands connected by transverse strands disposed transversely to said axis, said longitudinal strands being divided into two diametrically opposed groups, each strand of one of said diametrically opposed groups carrying current in a same direction when current is applied between said input and said output of said at least one coil, each of said diametrically opposed groups facing a respective one of said two diametrically opposed portions of a cylinder, said limited angular displacement of said shaft being less than a difference between a first angle subtended by one of said two diametrically opposed portions and a second angle subtended by one of said diametrically opposed groups; and at least one magnetic bearing supporting said shaft of said torque motor, said shaft being coupled to said mobile assembly.

12. A device according to claim 11 wherein said at least one magnetic bearing has two transverse control axes.

13. A device according to claim 12 wherein said at least one magnetic bearing comprises:

a ferromagnetic pole ring carried by said shaft;

a permanently axially magnetized ring disposed around said ferromagnetic pole ring and carried by said stator member;

two pairs of axial cores carrying coils concentric with said permanently axially magnetized ring; and two pole plates disposed around said permanently axially magnetized ring and said two pairs of axial cores.

14. A device according to claim 11 comprising two magnetic bearings each having two transverse control axes.

15. A device according to claim 13 wherein said ferromagnetic tubular portion of said torque motor includes two ferromagnetic pole rings and wherein said at least one magnetic bearing comprises two magnetic bearings.

16. A device according to claim 15 wherein said device further comprises:

a tilt control device including at least one pair of axial cores of said two pairs of axial cores of said at least one magnetic bearing; and a control unit adapted to vary a set point for a position of said shaft transversely to said axis for at least said coils of said at least one pair of axial cores.

17. A device according to claim 11 wherein said device further comprises a locking device adapted to hold said shaft radially in a predetermined configuration.

18. A device according to claim 17 wherein said device comprises two magnetic bearings and said locking device is disposed axially between said two magnetic bearings.

19. A device according to claim 17 wherein said locking device comprises:

a plurality of axial pins disposed a distance from said axial a plurality of clamps, provided with clamping shoes articulated relative to said stator member around said plurality of axial pins; and a maneuvering member for moving said plurality of clamps between an unlocked configuration in which each of said clamping shoes is at a maximal distance from said axis and a locked configuration in which each of said clamping shoes is at a minimal distance from said axis so as to induce radial clamping of said shaft.

20. A device according to claim 19 wherein each of said clamping shoes radially faces said ferromagnetic tubular portion of said torque motor.

21. A device according to claim 19 wherein said shaft comprises a plurality of axial abutments adapted to face each of said clamping shoes axially in said locked configuration such that said shaft is held axially in said locked configuration.

22. A device according to claim 19 wherein each of said plurality of clamps has circumferential slots, and wherein said maneuvering member comprises:

an annular ring concentric with said axis and being capable of an angular displacement; and a plurality of pins extending from said annular ring and engaging said circumferential slots, said plurality of pins being at first circumferential ends of said circumferential slots when said plurality of clamps are in said unlocked configuration and said plurality of pins being at second circumferential ends of said circumferential slots when said plurality of clamps are in said locked configuration.

23. A device according to claim 22 wherein said plurality of pins are each provided with bearings adapted to bear against a corresponding one of said circumferential slots.

24. A device according to claim 22 wherein said angular displacement of said annular ring is controlled by a second motor comprising:

a disk-shaped armature fastened to said annular ring; and a second field assembly coupled to said stator member of said device, said second field assembly being formed by at least one pair of circumferentially separated magnetic armatures capping without contacting a radially external periphery of said disk-shaped armature over separate angular sectors, each of said at least one pair of circumferentially separated magnetic armatures having two flanges forming opposing axial projections, each of said at least one pair of circumferentially separated magnetic armatures having at least one permanently magnetized ring portion coplanar with said axis, said at least one permanently magnetized ring portion generating a magnetic flux closing axially between said two flanges through said disk-shaped armature;

wherein said disk-shaped armature further comprises at least one plane coil having circular arc strands and radial strands, said circular arc strands forming an input and an output and being concentric with said axis, said radial strands connecting said circular arc strands so as to form at least one set of arcuate turns nested in each other but connected in series, said radial strands of each said at least one plane coil being grouped into at least one pair of groups formed of adjacent but separate radial strands so that, when current is applied between said input and said output of said at least one plane coil, all of said radial strands of each of said at least one pair of groups carry current in a same radial direction, each of said at least one pair of groups being disposed axially between said two flanges of a corresponding one of said at least one pair of circumferentially separated magnetic armatures; and wherein said magnetic flux flows through said disk-shaped armature between said two flanges in a direction such that, when current is applied between said input and said output of said at least one plane coil, an interaction between said current flowing in said radial strands of said at least one pair of groups and said magnetic flux generates torque on said disk-shaped armature in one direction, an angular amplitude of said angular displacement of said annular ring being defined by a difference between an angle subtended by said two flanges and an angle subtended by said at least one pair of groups of said radial strands.

25. A device according to claim 22 wherein each of said clamping shoes is urged radially towards said axis by spring members operating on said annular ring.

26. A device according to claim 22 wherein said maneuvering ring is joined to a portion of said stator member by a plurality of elastic members operating in compression and mobile in a plane transverse to said axis so as to be operable about an unstable configuration, such that said plurality of elastic members are radially oriented at one of two stable extreme positions when said plurality of clamps are in one of said locked and unlocked configurations.

27. The device according to claim 11 wherein said at least one magnetic bearing is radially facing said ferromagnetic tubular portion of said field assembly.

28. The device according to claim 17 wherein said locking device is radially facing said ferromagnetic tubular portion of said field assembly.

29. The device according to claim 11 further comprising a locking device adapted to hold said shaft radially in a predetermined configuration and wherein said at least one magnetic bearing and said locking device radially face said ferromagnetic tubular portion of said field assembly.

* * * * *

UNITED STATES PATENT AND TRADEMARK OFFICE
CERTIFICATE OF CORRECTION

PATENT NO. : 5,550,413
DATED : August 27, 1996
INVENTOR(S) : Bernus et al

It is certified that error appears in the above-indentified patent and that said Letters Patent is hereby corrected as shown below:

Title page, item [57], Abstract, after "torque" insert ---- motor ----.

Column 9, line 62, delete "a" first occurrence, insert ---- $\alpha$ ----.

Column 15, line 44, delete "axial" second occurrence, insert ---- axis; ----.

Signed and Sealed this

Third Day of June, 1997

Attest:

BRUCE LEHMAN

*Attesting Officer*   Commissioner of Patents and Trademarks